United States Patent [19]

Dubois et al.

[11] Patent Number: 4,960,243
[45] Date of Patent: Oct. 2, 1990

[54] THRUST REVERSER FOR A TURBOJET ENGINE

[75] Inventors: Claude A. G. Dubois, Honfleur; Xavier R. Y. Lore, Le Havre, both of France

[73] Assignee: Societe Anonyme Dite Hispano-Suiza, France

[21] Appl. No.: 424,333

[22] Filed: Oct. 19, 1989

[30] Foreign Application Priority Data

Oct. 20, 1988 [FR] France .................. 88 13766

[51] Int. Cl.⁵ .............................. F02K 1/64
[52] U.S. Cl. .................. 239/265.29; 60/226.2; 239/265.37; 244/110 B
[58] Field of Search ............ 239/265.25, 265.29, 239/265.37, 265.41; 60/226.2; 244/12.5, 23 D, 110 B

[56] References Cited

U.S. PATENT DOCUMENTS

| | | |
|---|---|---|
| 2,943,443 | 7/1960 | Voymas et al. . |
| 3,172,256 | 3/1965 | Kerry et al. . |
| 3,601,992 | 8/1970 | Maison ............... 239/265.29 |
| 3,605,411 | 9/1971 | Maison et al. . |
| 3,690,561 | 9/1972 | Potter ................ 239/265.29 |
| 3,703,258 | 11/1972 | Wildner ............. 239/265.29 |
| 3,739,582 | 6/1973 | Maison ............... 239/265.29 |
| 3,764,096 | 10/1973 | Wright ............... 239/265.29 |
| 3,856,239 | 12/1974 | Leibach . |
| 4,067,094 | 1/1978 | Ittner ................. 239/265.29 |
| 4,410,152 | 10/1983 | Kennedy et al. . |
| 4,485,970 | 12/1984 | Fournier et al. . |

FOREIGN PATENT DOCUMENTS

| | | |
|---|---|---|
| 2030034 | 10/1970 | France . |
| 2197115 | 3/1974 | France . |
| 2486153 | 1/1982 | France . |
| 2506843 | 12/1982 | France . |
| 2559838 | 8/1985 | France . |
| 820771 | 9/1959 | United Kingdom . |
| 1181746 | 2/1970 | United Kingdom . |

Primary Examiner—Andres Kashnikow
Assistant Examiner—Michael J. Forman
Attorney, Agent, or Firm—Bacon & Thomas

[57] ABSTRACT

A thrust reverser is disclosed having a thrust reverser door with an outer door panel pivotally attached to an inner door panel which, in turn, is pivotally attached to an annular housing. The door panels are pivotable about parallel, but displaced pivot axes such that the inner door panel undergoes a greater range of motion between its closed and open positions that does the outer door panel. This enables the inner door panel to be flush with the upstream and downstream portions of the inner housing surface to provide a smooth airflow through the air duct during the forward thrust mode, while at the same time enabling an efficient operation of the door during the reverse thrust mode.

22 Claims, 9 Drawing Sheets

THRUST REVERSER FOR A TURBOJET ENGINE

BACKGROUND OF THE INVENTION

The present invention relates to a thrust reverser for a turbofan-type turbojet engine in which pivotable thrust reverser doors change the direction of the turbofan air to provide thrust reversing forces.

Turbofan-type turbojet engines are well known in the art and typically comprise an annular housing concentrically surrounding the turbojet engine housing to define an annular, cold flow air duct extending along the longitudinal axis of the engine. A fan, driven by the turbojet engine, is typically located in the upstream portion of this duct and forces air through the duct to augment the thrust of the turbojet engine.

In such engines having a relatively high bypass ratio, a thrust reversing device may be associated with the annular housing to redirect the air passing through the cold flow air duct to provide the thrust reversing forces. It is known to provide one or more pivotable doors in the annular housing to redirect the air when necessary.

Figure 1:
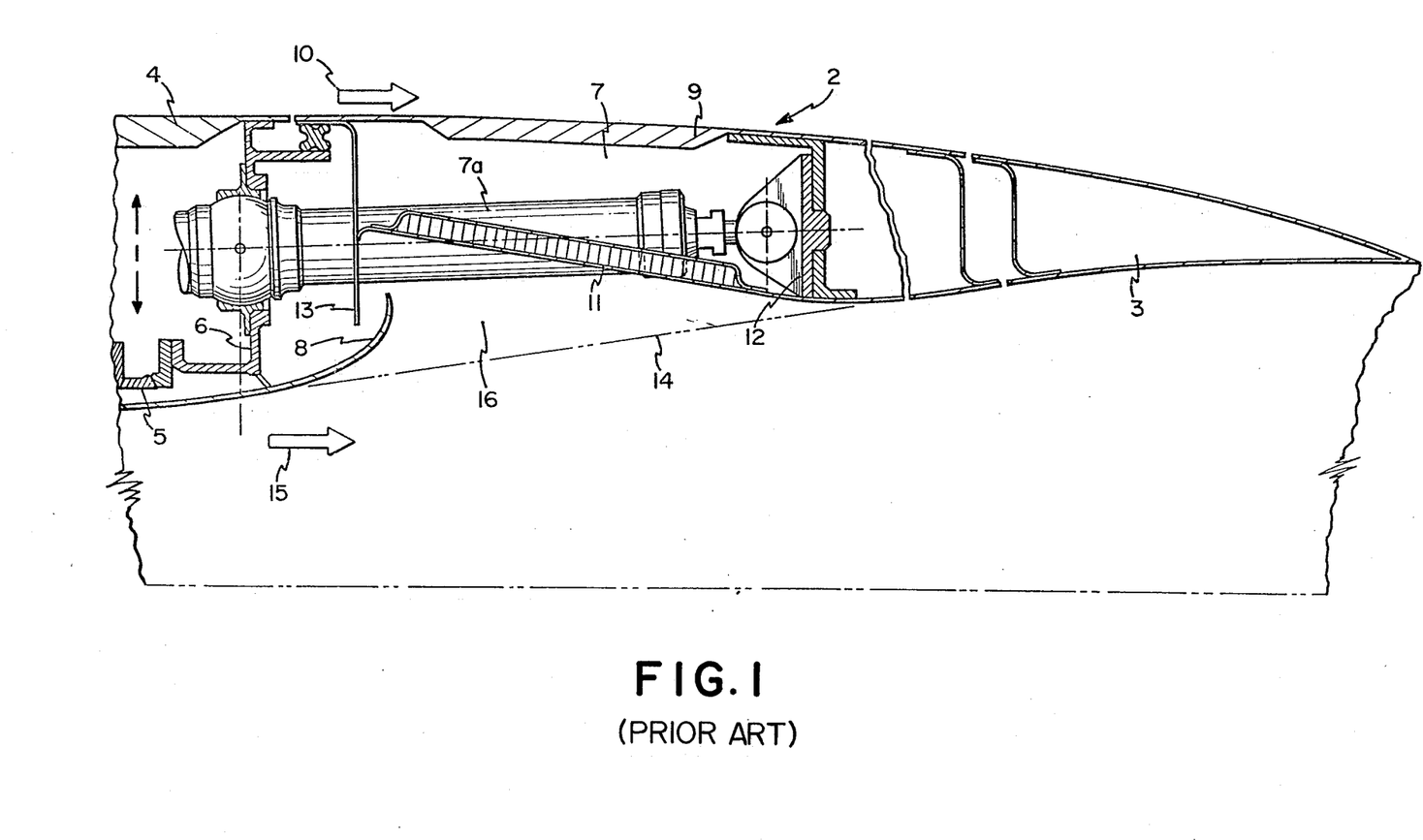
FIG. 1 is a partial longitudinal sectional view illustrating a thrust reverser door of the known type in a closed, forward thrust position.

Such a typical installation is illustrated in FIG. 1 wherein the annular housing has an upstream portion 1 formed by an outer panel 4 and an inner panel 5 joined by frame structure 6. The thrust reverser 2, comprising a pivotable door 7, extends between portion 1 and a downstream portion 3 to normally cover a laterally facing opening when the turbofan engine operates in the forward thrust mode. In this mode, outer door panel 9 is substantially flush with the outer panel 4 and the exterior surface of downstream cone 3 to provide a smooth airflow 10 over the exterior of the annular housing.

Frame structure 6 supports actuating cylinder 7a which has its extendible and retractable piston rod attached to internal structure 12 of the thrust reverser door 7. Structure 12 interconnects outer door panel 9 with inner door panel 11. These panels are also interconnected at their upstream edges by baffle member 13. In known fashion, extension of the piston rod of actuator 7a causes the door 7 to pivot such that its upstream end portion extends outwardly and a downstream end portion extends inwardly to block off the airflow 15 flowing through the cold flow air duct. The door redirects the air outwardly through the side of the annular housing to provide a thrust reversing force.

A deflection edge 8 extends from the inner housing panel 5 to minimize the turbulence of the air passing through the opening in the thrust reversing mode. In order to accommodate this deflection edge 8 when the door 7 is in its closed, forward thrust position, the inner door panel 11 is oriented such that its upstream end is closer to the outer panel 9 than is its downstream end. This orientation of the inner door panel, while being effective in the open, thrust reversing position of the door, defines an internal cavity 16 bounded by the inner door panel 11, upstream baffle 13, deflection edge 8 and the theoretical airflow line 14 extending between the inner housing panel 5 and the downstream cone 3. Line 14 represents the ideal, theoretical airflow through the airflow duct between inner housing panel 5 and downstream cone 3. The cavity 16 causes disturbances and perturbations in the air flow 15 passing through the cold flow air duct, thereby reducing its efficiency in the forward thrust mode.

Examples of such typical prior art thrust reversing door systems can be found in French patent Nos. 2,559,838; 2,506,843; 2,486,153; and 2,030,034. None of the systems illustrated in these patents, however, have resolved the problem of maintaining a smooth airflow path through the cold-flow air duct in the forward thrust mode as well as maximizing the efficiency of the door in the reverse thrust mode.

U.S. Pat. No. 3,605,411 discloses a thrust reversing door associated with an annular fan housing in which the position of the inner door panel relative to the outer door panel varies between the forward thrust mode and the reverse thrust mode. However, the means to actuate and drive the door between its open and closed positions, utilizing a slider and a guide roller, have not proven entirely satisfactory.

SUMMARY OF THE INVENTION

The thrust reverser according to the present invention has a thrust reverser door with an outer door panel pivotally attached to an inner door panel which, in turn, is pivotally attached to the annular housing. The door panels are pivotable about parallel, but displaced, pivot axes such that the inner door panel undergoes a greater range of motion between its closed and open positions than does the outer door panel. This enables the inner door panel to be flush with the upstream and downstream portions of the inner housing surface to provide a smooth airflow through the cold flow air duct during the forward thrust mode, while at the same time enabling an efficient operation of the door during the reverse thrust mode.

An actuator is connected to the inner door panel which, in turn, is connected to the outer door panel via a linkage mechanism. In the open, thrust reversing position, the inner door panel may define an obtuse angle with respect to the longitudinal axis of the annular housing.

DETAILED DESCRIPTION OF THE PREFERRED EMBODIMENTS

Figures 2, 3:
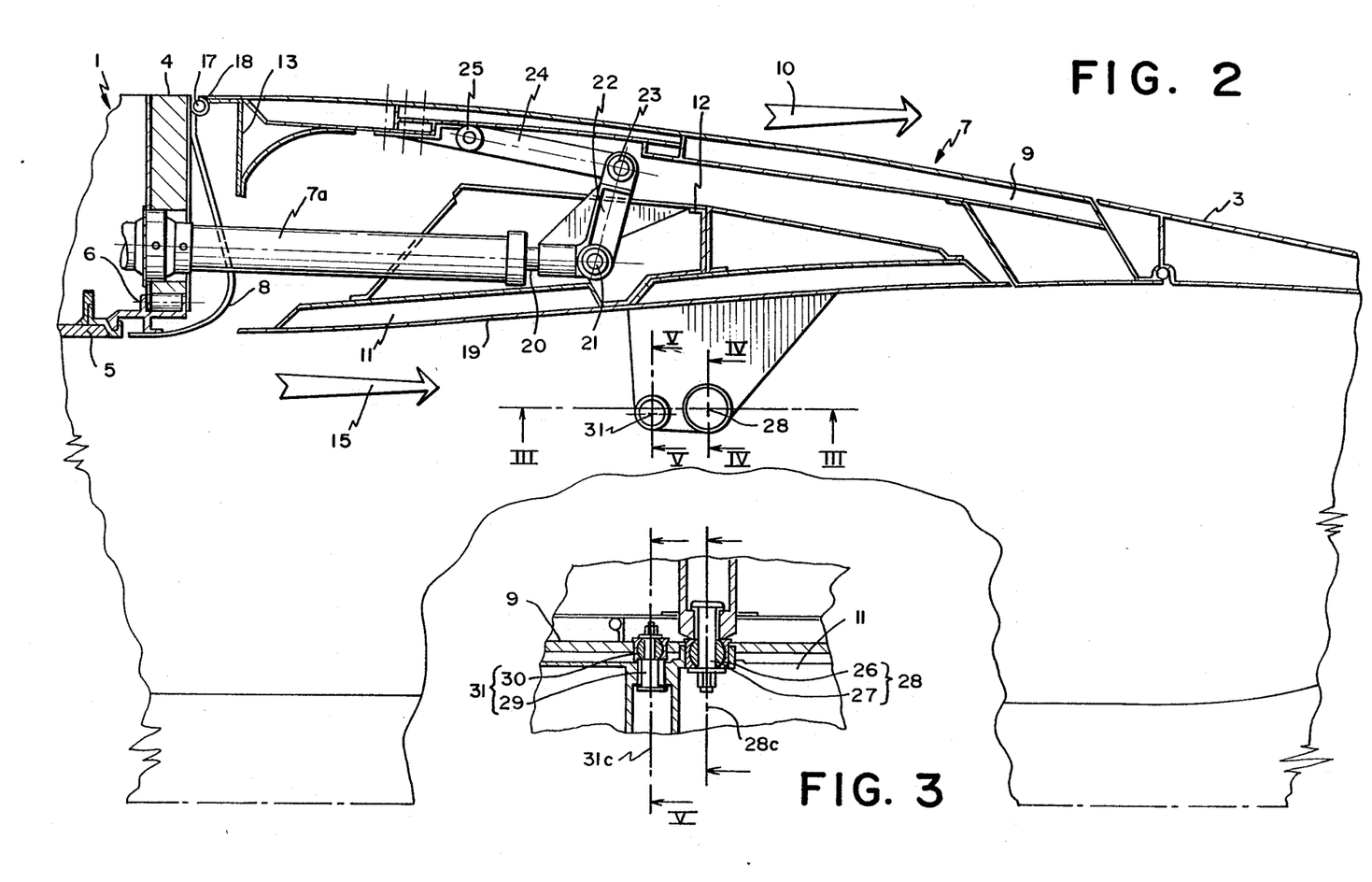
FIG. 2 is a partial, longitudinal cross sectional view illustrating a thrust reverser door according to the invention in a closed, forward thrust position.
FIG. 3 is a partial, cross sectional view taken along line III—III in FIG. 2.

A first embodiment of the thrust reverser door according to the invention is illustrated in FIGS. 2–6 wherein the elements, common to the known system illustrated in FIG. 1 have been assigned the same numbers. The upstream, stationary portion of the annular housing 1 comprises an outer surface panel 4 and an inner surface panel 5 interconnected by frame structure 6. The thrust reverser door 7 extends between the frame structure and a stationary, downstream annular housing portion 3. The thrust reverser door 7 comprises an outer door panel 9 and an inner door panel 11 having a frame structure 12 attached thereto. As can be seen in FIG. 2, when the door 7 is in the closed, forward thrust position, the exterior surface of outer door panel 9 is substantially flush with the outer housing panel 4 and the outer surface of the downstream annular portion 3 to provide for a smooth flow of air 10 over the exterior surface of the annular housing. Similarly, the inner surface 19 of inner door panel 11 is substantially flush with the inner housing panel 5 as well as the interior surface of the downstream annular portion 3 to provide a smooth air flow 15 through the duct.

A hydraulic actuator has its cylindrical portion 7a attached to the frame structure 6. The extendible and retractable piston rod 20 has its distal end connected to frame structure 12 by pivot joint 21. A fixed link member 22 is attached to the frame structure 12 such that its longitudinal axis passes through the pivot axis of pivot connection 21. The distal end of the link member 22 is attached to one end of link rod 24 by pivot connection 23. The opposite end of link rod 24 is pivotally attached to outer door panel 9 by pivot connection 25. In known fashion, the peripheral edge 18 of the outer door panel 9 cooperates with a seal member 17 to prevent the leakage of air through the area between the door periphery and the annular housing. Also in known fashion, deflection edge 8 is provided extending from inner housing panel 5 to minimize the air flow disturbances during the reverse thrust operating mode.

Figure 4:
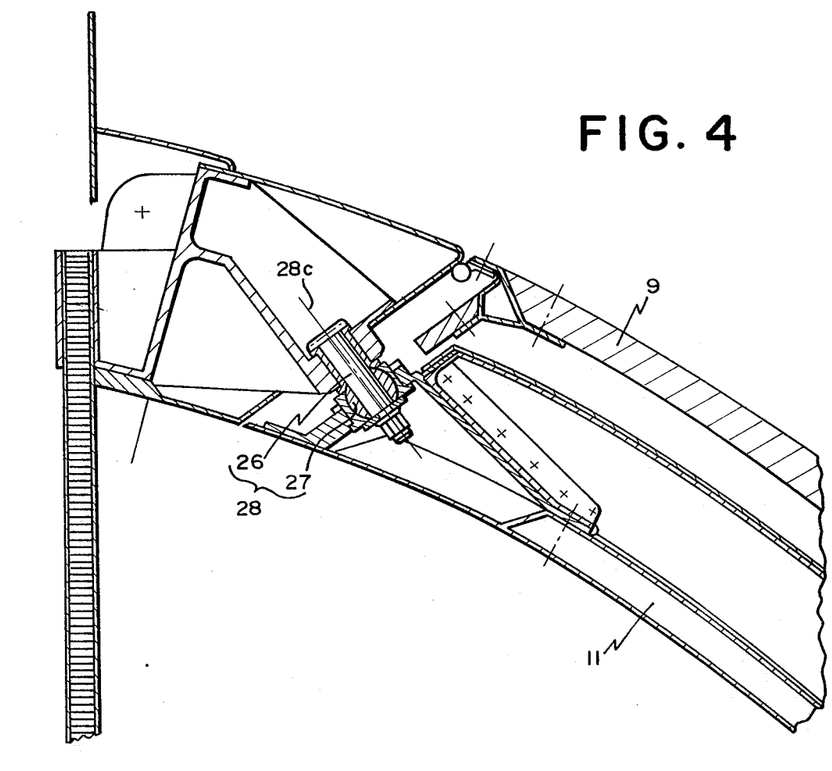
FIG. 4 is a partial, transverse sectional view taken along line IV—IV in FIG. 2.
Figure 5:
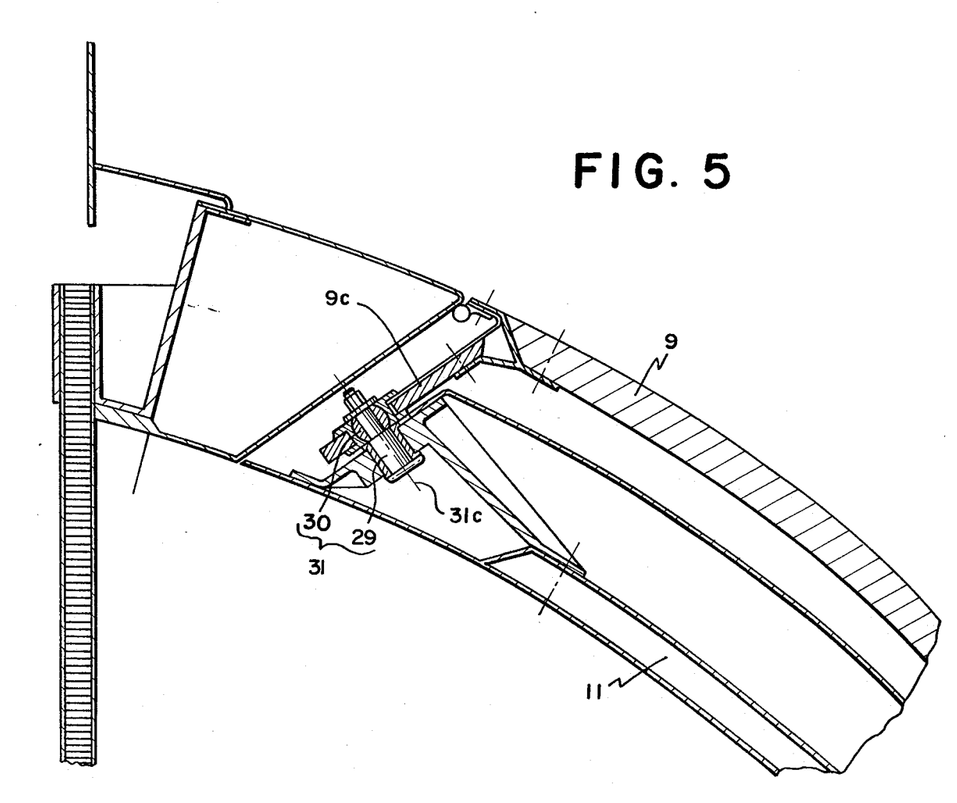
FIG. 5 is a partial, transverse cross sectional view taken along line V—V in FIG. 2.

As shown in FIGS. 3 and 4, the inner door panel 11 is pivotally attached to the annular housing by hinge pin 26 extending from a bracket attached to the housing and through a hinge member 27 attached to a bracket extending from the inner door panel 11. The structure forms a main pivot assembly 28 on either side of the door inner panel 11 such that the door may pivot about a main pivot axis 28c extending generally transverse to the longitudinal axis of the annular housing.

The outer door panel 9 has a bracket 9c extending from either side thereof in order to pivotally attach the outer door panel 9 to the inner door panel 11. This pivoting attachment is achieved by pivot pin 29 extending through the bracket attached to the inner door panel 11 and pivotally through a pivot element 30 affixed to the bracket 9c. The pivoting attachments on either lateral side of the door panels enable the outer door panel 9 to pivot with respect to the inner door panel 11 about an axis 31c. Axis 31c extends generally parallel to main pivot axis 28c, but, as illustrated in FIGS. 2 and 3, is laterally displaced therefrom.

Figure 6:
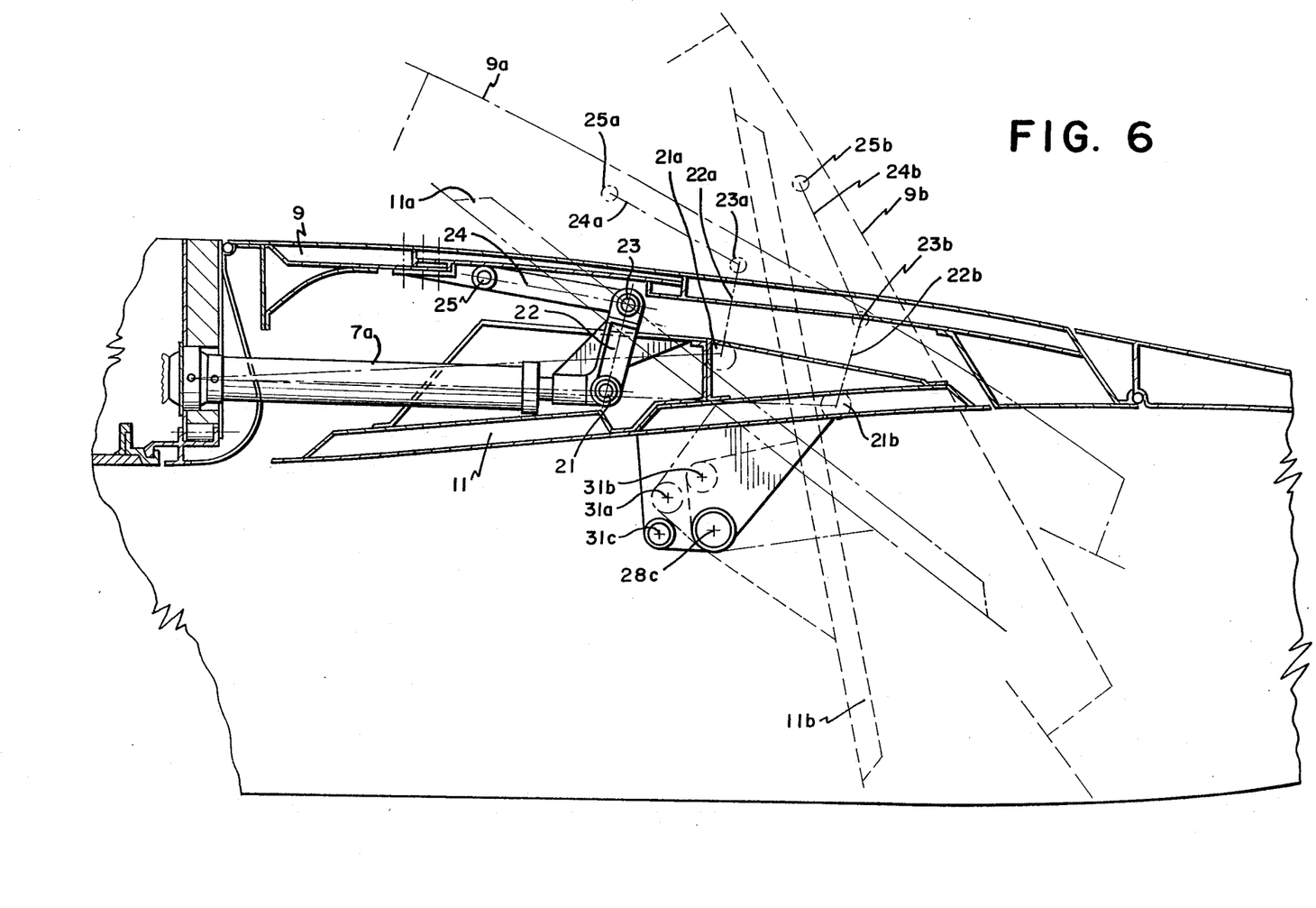
FIG. 6 is a partial, longitudinal cross sectional view similar to FIG. 2, illustrating the movement of the thrust reverser door between its open and closed positions.

The motion of the thrust reversing door 7 is illustrated in FIG. 6 wherein the door is illustrated in the closed, forward thrust mode by solid lines; in an intermediate position by dash-dot lines; and in the open, thrust reversing mode positions by the dashed lines. The various elements have been assigned the letter a to indicate their positions in the intermediate door positions and have been assigned the letter b to indicate their positions in the fully open door position.

As can be seen, the extension of the piston rod 20 causes both the outer door panel 9 and the inner door panel 11 to pivot about primary attachment axis 28c. In addition, the pivoting connection 31 between the outer door panel 9 and the inner door panel 11, as well as the linkage interconnecting these door panels causes the position of the inner door panel 11 with respect to the outer panel 9 to change as both of the door panels pivot. In the closed, forward thrust position, the inner surface 19 of inner door panel 11 is substantially flush with inner housing panel 5 and the interior surface of the downstream portion 3. Thus, as illustrated in FIG. 6, the upstream portions of the inner and outer door panels 11 and 9, respectively, (toward the left as illustrated in FIG. 6) are displaced further apart than are the downstream portions of these door panels. However, in their fully opened positions, the upstream portion of the inner door panel 11 is closer to the outer door panel 9 than is the downstream portion. This enables the door to efficiently redirect the air flow passing through the cold flow duct in a thrust reversing mode. The geometry of the pivot axes as well as the interconnecting linkage enables the inner door panel 11 to undergo a greater angle of rotation than does the outer door panel 9.

The location of the main pivot axis 28c is such that the forces acting on the inner and outer door panels during movement of the door 7 between its open and closed positions are balanced. The forces exerted on the door 7 by the airflow upstream of the pivot axis 28c and downstream of the pivot axis 28c are such that a resultant force passes through the axis 28c. In this manner, the force necessary to move the door 7 between its open and closed positions is minimized, thereby enabling the actuators and the associated thrust reverser structures to be made lighter to reduce the bulk and weight of the apparatus.

Three-engined aircraft, particularly those with the third engine mounted in the tail of the aircraft, present particular difficulties for thrust reversing systems incorporating pivotable thrust reverser doors. These difficulties include the possibility of re-ingestion of the exhaust gases and instability of the aircraft should the exhaust gases be directed onto flight control surfaces during the thrust reversing mode of operation. The embodiment of the thrust reverser illustrated in FIGS. 7 and 8 is designed to minimize or eliminate the dangers associated with such a thrust reverser installation.

In this embodiment, elements having the same function as those in the previously described embodiment have been given the same identification numbers. Thus, the stationary upstream portion of the annular housing 1 has an outer housing panel 4 and an inner housing panel 5 interconnected by a structure 6. An actuator has a cylinder 7a attached to the structure 6 and has an extendible and contractible piston rod 20 interconnected pivotally with structure 12 mounted on inner door panel 11. Outer door panel 9 is connected to inner door panel 11 via link rod 24 having one end pivotally attached to the outer door at 25 and the opposite end pivotally attached to link rod 22 by pivot 23. As in the previously described embodiment, outer door panel 9 is pivotally attached to the inner door panel 11 so as to pivot about axis 31c, while the inner door panel 11 is pivotally attached to the annular housing 1 so as to pivot about primary pivot axis 28c.

Figure 7:
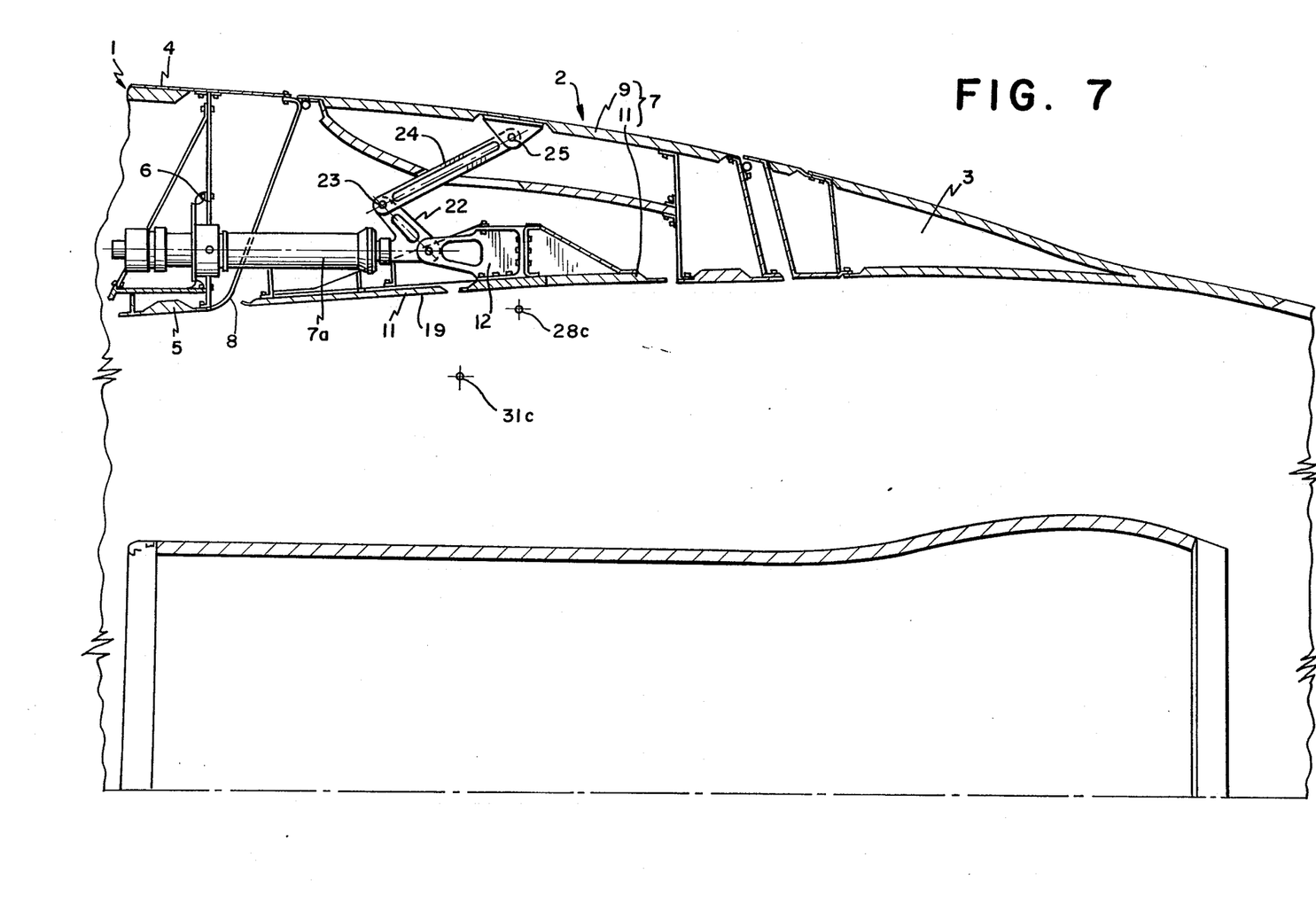
FIG. 7 is a partial, longitudinal cross sectional view illustrating a second embodiment of the thrust reverser door according to the invention in its closed, forward thrust position.

When the door 7 is in its closed position, as illustrated in FIG. 7, the outer surface of outer door panel 9 is substantially flush with the outer housing panel 4 and the exterior surface of rear portion 3. The inner surface 19 of inner door panel 11 is substantially flush with the interior surface of inner housing panel 5 and the interior surface of downstream housing portion 3 so as to promote smooth air flow through the cold flow air duct.

Figure 8:
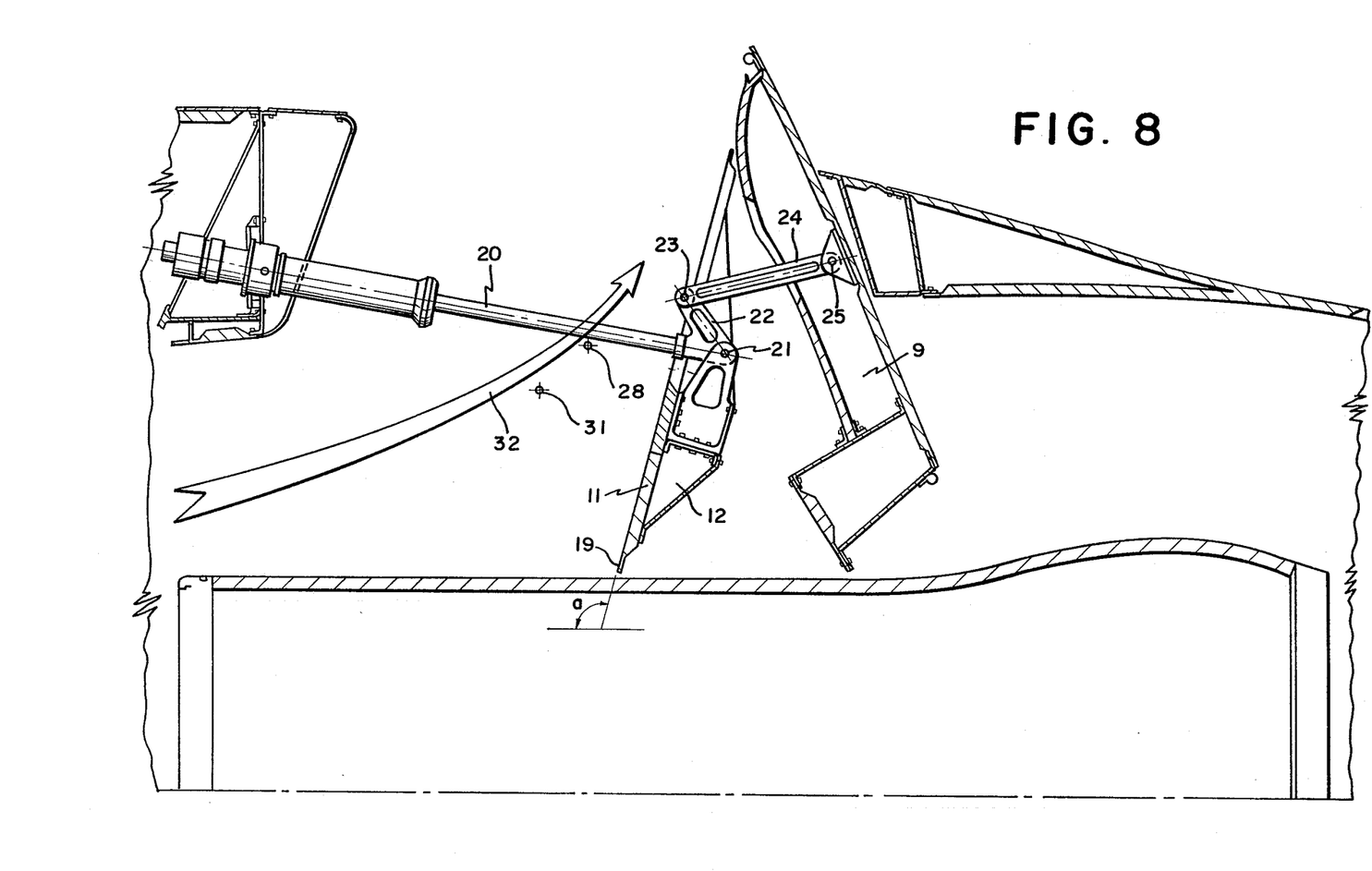
FIG. 8 is a partial, longitudinal cross sectional view similar to FIG. 7, showing the second embodiment of the thrust reverser door in its open position.

As in the first embodiment, when the door 7 is moved to its opened position, the inner door panel 11 undergoes a greater angle of movement than does outer door panel 9, as illustrated in FIG. 8. The length of the actuator 7a, and its piston rod 20, as well as the length of link rod 24 and the orientation of link 22 are such that, when the inner door panel 11 is in its fully open position, its inner surface 19 defines an angle a with respect to the longitudinal axis of the housing that is more than 90°. The contours of the inner and outer door panels match this configuration, particularly the upstream door contours to enhance the airflow 32 outwardly through the annular housing 1.

The operation of the second embodiment of the thrust reverser is similar to that previously described. The airflow 32, in the thrust reversing mode, is deflected in a direction having a small downstream component to avoid any possibility of re-ingestion by the jet engine intake and to minimize interference with the flight control surfaces of the aircraft in order to maintain its stability.

Figure 9:
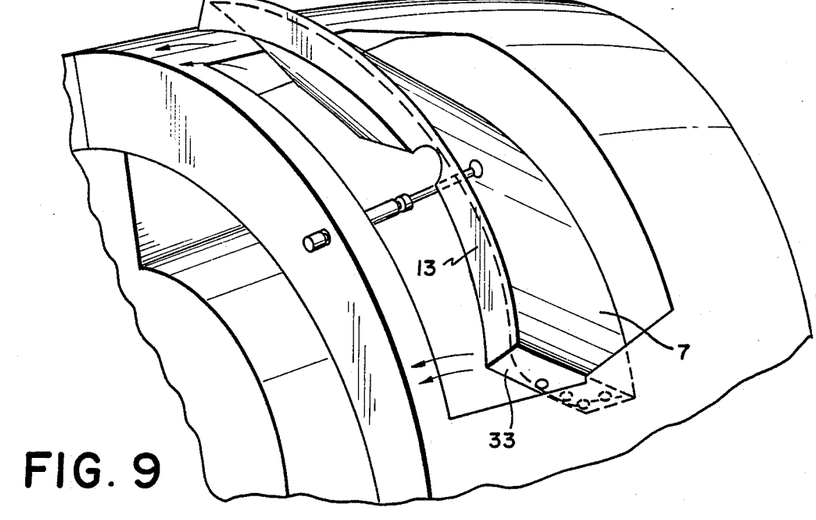
FIG. 9 is a partial, perspective view of the thrust reverser door in FIGS. 7 and 8 illustrating a first embodiment of the transverse and lateral baffles.

Additional features may be incorporated into the structure of the thrust reverser doors 7 to direct the thrust reversing airflow in a specific direction to further avoid the aforementioned dangers. In an embodiment illustrated in FIG. 9, a transverse baffle member 13a extends across the upstream edge of the outer door panel 9. This baffle is similar to baffle member 13 illustrated in FIGS. 2 and 6. Lateral baffle members 33 extend from opposite sides of the outer door panel 9 in a direction generally parallel to the longitudinal axis of the housing. The baffles will direct the gases passing through the annular housing in a direction generally parallel to the longitudinal axis of the housing.

Figure 10:
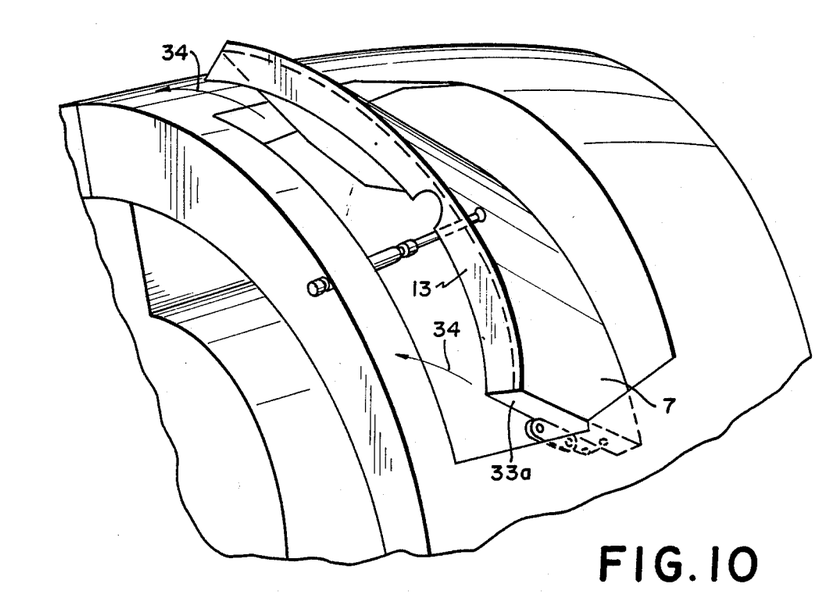
FIG. 10 is a partial, perspective view similar to FIG. 9 illustrating a second embodiment of the transverse and lateral baffles.

In FIG. 10, the lateral baffle members 33a are skewed relative to the longitudinal axis of the housing and direct the gases 34 in a direction oblique to the longitudinal axis.

Figures 11, 12:
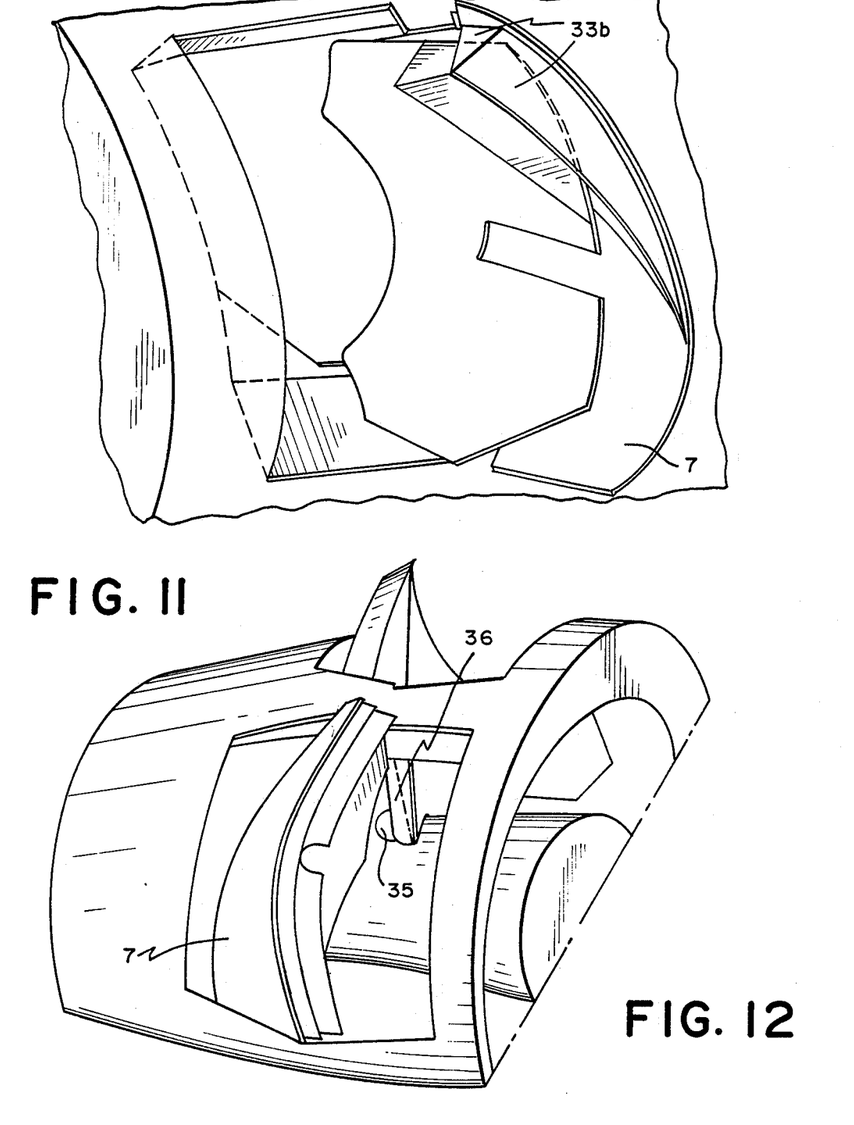
FIG. 11 is a partial, perspective view illustrating the thrust reverser door of FIGS. 7 and 8 and showing a third embodiment of the transverse and lateral baffles.
FIG. 12 is a partial, perspective view of the thrust reversing doors shown in FIGS. 7 and 8 illustrating a baffle member attached to the downstream portion of the doors.

In FIG. 11, the transverse portion of baffle member 33b is of a tapered length, increasing toward one side of the outer door panel 9. The side portion is joined to a small laterally extending baffle portion in order to direct the airflow in a selected direction to avoid any interference with the aircraft control surfaces.

The thrust reverser according to the invention may include a plurality of thrust reversing door assemblies displaced circumferentially around the annular housing 1. It is also possible that less than all of the number of thrust reversing doors will open such that the inner door panel 11 defines an obtuse angle with the longitudinal axis of the annular housing. In this instance, the thrust reverser doors adjacent to the obtusely opening door will define an internal gap 35 which would allow air to leak past the doors, thereby decreasing the efficiency of the thrust reversing device. This problem may be obviated by the incorporation of interior downstream baffles 36 mounted on a downstream portion of the inner door panels 11 and extending laterally therefrom.

The foregoing description is provided for illustrative purposes only and should not be construed as in any way limiting this invention, the scope of which is defined solely by the appended claims.

What is claimed is:

1. A thrust reverser for a turbojet engine having an annular housing extending along a longitudinal axis and having an outer housing surface, an inner housing surface defining an airflow duct and at least one laterally facing opening, comprising:
   (a) at least one thrust reverser door having an outer door panel and an inner door panel located radially inwardly from the outer door panel, movable between a closed position wherein the door covers the at least one laterally facing opening such that the inner door panel is substantially flush with the inner housing surface and the outer door panel is substantially flush with the outer housing surface, and an open position wherein the at least one laterally facing opening is uncovered;
   (b) first attaching means to pivotally attach the inner door panel to the annular housing such that the inner door panel pivots about a first pivot axis extending generally transverse to the longitudinal axis;
   (c) second attaching means to pivotally attach the outer door panel to the inner door panel such that it may pivot about a second pivot axis extending generally parallel to, but displaced from, the first pivot axis;
   (d) actuating means connected between the annular housing and the inner door panel to move the at least one thrust reverser door between its open and closed positions; and,
   (e) linkage means interconnecting the inner and outer door panels such that the inner door panel pivots through a greater angle than the outer door panel as the at least one thrust reverser door moves between its open and closed positions.

2. The thrust reverser according to claim 1 wherein the first pivot axis is located such that, when the at least one thrust reverser door is in its open position, a downstream portion of the inner door panel extends into the airflow duct to direct the air through the at least one laterally facing opening.

3. The thrust reverser according to claim 2 wherein the first pivot axis is located with respect to the inner door panel such that, when the at least one thrust reverser door is in its open position, the forces exerted on the inner and outer door panels are balanced such that a resultant force passes generally through the first pivot axis.

4. The thrust reverser according to claim 1 wherein the linkage means comprises:
   (a) a first link rod attached to the inner door panel; and,
   (b) a second link rod pivotally connected to the outer door panel and to the first link rod.

5. The thrust reverser according to claim 4 wherein the first link rod has a longitudinal axis and is fixedly attached to the inner door panel such that the longitudinal axis of the first link rod passes through an axis of a pivot interconnection between the actuating means and the inner door panel.

6. The thrust reverser according to claim 1 wherein the actuating means comprises cylinder means having an extendible and retractable piston rod pivotally attached to the inner door panel.

7. The thrust reverser according to claim 1 wherein the relationship between the actuator means and the first pivot axis is such that, when the at least one thrust reverser door is in the open position, the inner door panel defines an obtuse angle with the longitudinal axis.

8. The thrust reverser according to claim 7 further comprising a transverse baffle member extending inwardly from an upstream edge of the outer door panel.

9. The thrust reverser according to claim 8 further comprising lateral baffle members extending inwardly from side edges of the outer door panel.

10. The thrust reverser according to claim 9 wherein the lateral baffle members extend generally parallel to the longitudinal axis.

11. The thrust reverser according to claim 9 wherein the lateral baffle members are skewed with respect to the longitudinal axis.

12. The thrust reverser according to claim 8 wherein the length of the transverse baffle member varies across the outer door panel.

13. The thrust reverser according to claim 7 wherein the first pivot axis is located such that, when the at least one thrust reverser door is in its open position, a downstream portion of the inner door panel extends into the airflow duct to direct the air through the at least one laterally facing opening.

14. The thrust reverser according to claim 13 further comprising interior baffles extending from the downstream portion of the inner door panel.

15. The thrust reverser according to claim 1 comprising n number of thrust reverser doors wherein a number less than n of the thrust reverser doors have inner door panels defining an obtuse angle with the longitudinal axis when the thrust reverser doors are in their open positions.

16. The thrust reverser according to claim 15 further comprising a transverse baffle member extending inwardly from an upstream edge of the outer door panel.

17. The thrust reverser according to claim 16 further comprising lateral baffle members extending inwardly from side edges of the outer door panel.

18. The thrust reverser according to claim 17 wherein the lateral baffle members extend generally parallel to the longitudinal axis.

19. The thrust reverser according to claim 17 wherein the lateral baffle members are skewed with respect to the longitudinal axis.

20. The thrust reverser according to claim 16 wherein the length of the transverse baffle member varies across the outer door panel.

21. The thrust reverser according to claim 15 wherein the first pivot axis is located such that, when the at least one thrust reverser door is in its open position, a downstream portion of the inner door panel extends into the airflow duct to direct the air through the at least one laterally facing opening.

22. The thrust reverser according to claim 21 further comprising interior baffles extending from the downstream portion of the inner door panel.

* * * * *